United States Patent [19]
McConnell

[11] 3,812,254
[45] May 21, 1974

[54] CONTROL OF PYTHIUM SPP. AND SCLEROTIUM SPP. USING AZIDES

[75] Inventor: William C. McConnell, Griffin, Ga.

[73] Assignee: PPG Industries, Inc., Pittsburgh, Pa.

[22] Filed: June 25, 1971

[21] Appl. No.: 157,028

[52] U.S. Cl. .............................................. 424/226
[51] Int. Cl. ............................................ A01n 9/20
[58] Field of Search .................................. 424/226

[56] References Cited
UNITED STATES PATENTS
3,087,777  4/1963  Lundgren et al. ............ 252/8.55 X FOREIGN PATENTS OR APPLICATIONS
1,016,391  1/1966  Great Britain OTHER PUBLICATIONS
Chemical Abstracts, Vol. 38, item 4876–4879, 1944.
Chemical Abstracts, Vol. 58, item 1868f, 1963.
Chemical Abstracts, Vol. 58, item 1870b, 1963.
Chemical Abstracts, Vol. 62, item 16662b, 1965.
Chemical Abstracts, Vol. 63, item 6259d, 1965.
Chemical Abstracts, Vol. 72, item 63856r, 1970.

Primary Examiner—Albert T. Meyers
Assistant Examiner—D. W. Robinson
Attorney, Agent, or Firm—John W. Linkhauer; George D. Morris

[57] ABSTRACT

Alkali metal azides, alkaline earth metal azides, ammonium azide, or mixtures thereof are used to control Pythium spp. and Sclerotium spp.

19 Claims, No Drawings

CONTROL OF PYTHIUM SPP. AND SCLEROTIUM SPP. USING AZIDES

Two genera of fungus, Sclerotium spp. and Pythium spp., have proved to be damaging to many crops as, for example, corn (*Zea mays L.*), soybeans (*Glycine max* [*L.*] *Merr.*), and especially peanuts (*Arachis hypogaea L.*). Pythium spp. is a problem in turfgrasses (*Family Graminaceae*). An exemplary genus is Agrostis. Bentgrass golf greens particularly are damaged by this fungus.

It has now been found that these fungi may be controlled by applying to the soil containing one or more of these fungi, alkali metal azide, alkaline earth metal azide, ammonium azide, or mixtures of these. Alternatively, these azides may be applied directly to the fungus.

Exemplary species of Pythium are *P. aphanidermatum*, *P. debaryanum*, *P. deliense*, and *P. ultimum*. Exemplary species of Sclerotium are *S. rolfsii*, *S. bataticola*, *S. tuliparum*, and *S. cosseicola*. A particularly noxious species of Sclerotium is *S. rolfsii*.

While lithium azide, sodium azide, potassium azide, rubidium azide, and cesium azide, or mixtures thereof, may be used in the practice of this invention, the azides of sodium, potassium, and mixtures thereof are preferred. Particularly preferred is potassium azide.

Ammonium azide is advantageously used where the presence of alkali metal ions or alkaline earth metal ions is not desired.

Beryllium azide, magnesium azide, calcium azide, strontium azide, barium azide, and mixtures of these are suitable for use in this invention. Of these, magnesium azide, calcium azide, strontium azide, and barium azide are preferred because of the scarcity and high cost of beryllium azide. Magnesium azide and calcium azide are especially preferred.

Mixtures of any of the azides listed above may be used in the practice of this invention. The mixtures may be within a chemical class such as mixtures of sodium azide and potassium azide, or members of different classes may be combined as exemplified by mixtures of potassium azide and calcium azide. Ammonium azide may also be mixed with any of the alkali metal and/or alkaline earth metal azides.

In accordance with one embodiment of this invention, the azide is applied to the soil containing Pythium spp. and/or Sclerotium spp. in order to control the fungus. While it is preferred that enough azide be applied to kill substantially all of these fungi present, significant results can be achieved by applying lesser amounts which kill only a portion of the fungus population. The surviving fungi are often so few in numbers that crop damage is small. Similarly, even lesser amounts may be applied to merely retard further growth of fungi. Amounts of the alkali metal azide, alkaline earth metal azide, ammonium azide, or mixtures thereof applied to the soil containing the specified fungi usually vary from about 0.5 to about 500 pounds per acre. More often, the rate of application is from about 1 to about 200 pounds per acre. Generally the rates vary from about 2 to about 50 pounds per acre. Rates varying from about 5 to about 25 pounds per acre are most often used.

The azide is often conveniently applied as an aqueous solution. Sprays, drenches, irrigations, and injections are conveniently used.

These azides may also be conveniently applied as an ammonia solution. While anhydrous ammonia may be used, the solubility of most of the azides may be increased by the addition of water. Ammonia solutions of azide may be applied similarly to aqueous solutions of azide. Sprays, drenches, irrigations, and injections are within contemplation.

Azide may also be applied to the soil in the form of crystals, granules, or finely-comminuted dry dust. When it is desired to apply a dust, the azide may be ground to a very fine powder size, usually minus 100 mesh (U.S. Sieve Series). It is usually desirable to dilute the azide with inert solid diluent such as silica, clay, talc, bentonite, diatomaceous earth, woodflour, etc. Good distribution of the azide is usually facilitated by diluting the azide with up to in excess of 99 per cent inert dust. Sometimes formulations containing about 5 to about 75, rarely in excess of 80, per cent of azide are useful.

Another effective method of diluting the azide for solid application is to supply the azide as an absorbed ingredient or coating of granules of inert material, for example, attapulgite clay, corncob, sawdust, bentonite, etc. The azide may also be absorbed or coated on other pesticides, pesticide-containing granules, or fertilizers. Alkali metal azide, alkaline earth metal azide, ammonium azide, or mixtures thereof is usually present in these granules, etc., in amounts of less than about 85 per cent by weight basis the granules, including all absorbed constituents, although greater proportions are possible and within contemplation. The alkali metal azide, alkaline earth metal azide, and/or ammonium azide content of these granular products typically ranges from about 1 to about 85 per cent, most often from about 2 to about 50 per cent.

When the azide is applied to the soil in crystal, granular, or other solid forms, it is sometimes allowed to lie on the soil exposed to normal weather conditions. It is more often watered into the soil. It is frequently harrowed or plowed into the earth. In general, azide may, because of its very flexible properties, be applied to the soil by any known technique commonly used in the application of presently-available fertilizers and/or pesticides.

The soil is preferably cultivated prior to application of the azide. This loosens the soil and renders it more receptive to the azide. Following application, the azide is also preferably incorporated into the soil by, for example, harrowing, discing, plowing, rototilling, or hilling. While both cultivation and incorporation are preferably used conjointly, either of these operations may be used alone, or neither may be used at all. The effectiveness of the azide treatment is enhanced by covering the treated soil with sheeting which is substantially vapor impervious, usually until the azide has decomposed. Polyethylene sheeting is well suited for this purpose although other materials such as polypropylene, polyvinyl chloride, polyvinylidene chloride, poly(ethylene terephthalate), and waterproofed paper are suitable. This technique is particularly suitable for seed beds and areas where high value crops are grown.

The equipment heretofore used to apply aqueous solutions or ammonia to the soil may be used to apply azide solutions to the soil. Thus, solutions may be applied using a tool bar applicator which draws one or more knives which have at least one injection port through the soil. Another method which may be used to advantage is a plow-down application. Still another method is direct injection into the soil. Spraying is also useful. Where irrigation is used in the preparation or treatment of a field, the azide may be added to the water stream prior to its entering the field. The azide may be dissolved in water to form a solution which is then metered into the stream. Similarly, aqueous ammonia solutions or anhydrous ammonia solutions may be injected into the stream. It is not necessary to form a solution of the azide prior to adding the azide to the stream, but this procedure is preferred since solutions are generally more accurately metered than are solids.

Solid forms of the azide may be applied using broadcasters, spreaders, granule-applying chisels, and similar equipment.

Fields containing fungi may be treated with azide in various ways. Over-all treatment may be used wherein azide is applied over the entire field. Row treatment is also suitable and is less expensive than over-all treatment. The azide may be applied in furrows, sometimes combined with fertilizer. When the azide is applied as a chisel or furrow treatment at planting, it may advantageously be placed below, to one side of, or both below and to the side of the seed or seedling being planted. Strip treatment may be used where wide-row crops such as orchards, vineyards, groves, and nursery liner plantings are to be planted. The treated strip is usually 6 to 12 feet wide and centered on the future transplanting site. This method is cheaper than over-all treatment due to the savings in azide. However, there is the disadvantage that fungi are likely to be introduced to the treated area soon after planting by movement of the soil from the adjacent untreated areas. Spot treatment may be used where fungus infestation or damage is restricted to well-defined spots.

In one embodiment of this invention the azide may be used for control of Pythium and Sclerotium by pre-emergent applications. The azide is preferably applied before crops are planted. Early spring is the preferred time, although any time of the year is suitable. Planting is ordinarily made within about 120 days of application of the azide. More usually, planting is made within about 30 days of azide application. The minimum allowable interval between azide application and planting is governed by the amount of azide applied to the soil, the rate of azide decomposition, and the azide tolerance of the crop plants. When the rates of azide application are low and the azide tolerance of the crop seedling or seed is sufficiently high, planting may be accomplished almost immediately before, concurrently with, or almost immediately after application of the azide. The pre-plant method permits additional flexibility because amounts of azide in excess of the amount which would kill or retard the crop plant may be applied if desired. Sufficient time is then allowed for the azide concentration to abate to safe levels. Crop seedlings or seeds may then be set out.

In another form of pre-emergent application, the azide is applied to the soil subsequent to seeding the crop plants but prior to the emergence of the crop seedling through the soil. While the amounts applied are ordinarily as above described, it may generally be stated that greater amounts of the composition may be used as the crop seed is positioned deeper in the soil.

In another form, the azide is applied to the soil close to, but not directly above, the seed. This may be achieved for row crops by applying the azide as one or more sidebands.

In still another form, the azide is applied as a layer below the surface of the soil. The layer may conveniently be located above or below the seed, depending upon the tolerance of the seed. Subsoil layering can also be used.

In another form of pre-emergent application, the azide is applied to the soil concurrently with the application of the crop seed. Here the seed and azide may be applied by separate systems or the seed and the azide may be mixed and applied by the same system. When the azide and seeds are mixed prior to application, it is usually desirable that the azide be in the form of a flowable solid such as crystals, powder, or granules.

It is often advantageous to apply the azide to the soil post-emergence to the crop plants. The application rate is adjusted so that the growth of the fungus is inhibited while the crop plant suffers no significant damage.

In the practice of this invention, the azide may be applied with any compatible fertilizer or pesticide. It is usually advantageous to provide a small amount of a soluble base such as sodium carbonate, potassium carbonate, or ammonia with the azide to discourage hydrolysis during shipping, storage, and handling.

Multiple applications of the azide are also within the contemplation of this invention. This is particularly desirable where maximum control of Pythium or Sclerotium is desired for high value crops. As an example, soil may be treated, then plowed, then treated again to distribute the azide throughout the soil.

The basic principles of the present invention have been incorporated by way of example in the following specific embodiments.

EXAMPLE I

A potato starch solution is prepared by autoclaving water (500 cc) and seed potato (200 grams) for 40 minutes and then straining the solution. An agar solution is prepared by boiling agar (17 grams) in water (500 cc). A potato agar solution is prepared by mixing the potato solution and the agar solution, adjusting the volume to 1,000 cc total and dissolving dextrose (20 grams) into the solution. The solution is then bottled in 100 ml bottles, autoclaved, and stored in the refrigerator.

Bottles of agar are melted in boiling water. Dry potassium azide is added and dissolved and mixed uniformly by shaking.

The bottle mouths are flame sterilized and 25 cc of solution is poured into four 5-inch steril petri dishes. The dishes are covered and the agar is allowed to harden to form agar plates. Untreated controls are also prepared.

A flame sterilized 5 mm cork borer is used to cut a plug of pathogen-agar at the edge of a culture growing on agar. The plug is removed with a sterile scalpel. One 5 mm plug is inverted and placed in the center of each plate of agar-azide and untreated check. These plates are then recovered and held at room temperature for 5 to 10 days. The agar plates are evaluated by noting the growth of the fungus disk in millimeters. From those agar plates showing no pathogen development, 5 mm plugs are removed and placed on a clean plate of agar that contains no azide. The results are shown in Table 1.

Table 1

Inhibition of *Pythium* spp. by Potassium Azide

| Concentration of KN₃ in Agar, ppm. | Growth of Fungus Disc, mm. |
|---|---|
| 1000 | 0 |
| 500 | 0 |
| 200 | 0 |
| 100 | 0 |
| 50 | 0 |
| 25 | 0 |
| 10 | 0 |
| 5 | 36 |
| 0 | 28 |

EXAMPLE II

The general procedure of Example I is repeated except that sodium azide is used instead of potassium azide and the evaluations are made after a growth period of 6 days. The results are shown in Table 2.

Table 2

Inhibition of *Pythium* spp. by Sodium Azide

| Concentration of NaN₃ in Agar, ppm. | Growth of Fungus Disc, mm. |
|---|---|
| 100 | 0 |
| 50 | 0 |
| 25 | 0 |
| 10 | 0 |
| 5 | 25 |
| 0 | >40 |

EXAMPLE III

Fungus inoculum is produced by growing the test fungi on autoclaved oat seed for 3 to 6 weeks in 2-liter flasks.

Norfolk sandy loam having a pH of 5.2 and a field capacity of 12.2 per cent moisture is oven-dried at 105°C. for 3 to 5 days. Two hundred grams of the dried soil are placed into several 8-oz. specimen bottles with seal-tight plastic lids. The bottled soil is autoclaved for 30 minutes.

Using sterile technique, 20 seeds from the fungus inoculum are added to the soil in each bottle. The bottles are rotated so that the seeds are evenly distributed through the soil. Twenty-four milliliters of sterile distilled water are added to the soil in each bottle. The bottles are incubated for 3 days at 27°C. During this period the fungi is allowed to grow from the seeds through the soil. Potassium azide is added to most of the bottles in 0.5 milliliter of distilled water. The same amount of distilled water without any potassium azide is added to some bottles. This last addition of water or potassium azide solution brings the soil to field capacity. The bottles are sealed and incubated for 3 days at 27°C. The bottles are then opened and 5 seeds are transferred to 2 petri plates containing Martin's Rose bengal—*Streptomycin agar* medium (Johnson, L. F. "Effect of Antibiotics on the Numbers of Bacteria and Fungi Isolated from Soil by the Dilution-plate Method," *Phytopathology*, Vol. 47, pp. 630–631 (1957) from the soil in each bottle. A total of 10 seeds is assayed for the presence of living fungi from each bottle. The number of seeds from which fungus hyphae grew is determined for each treatment. A randomized block design with 3 replications is used in these tests. The concentration of potassium azide and the results are shown in Table 3.

Table 3

| KN₃ Concentration, ppm. | Numbers of Seed-Containing Living *Sclerotium rolfsii* | | | | | | Mean¹ |
| | Rep. I | | Rep. II | | Rep. III | | |
| | Plate 1 | Plate 2 | Plate 1 | Plate 2 | Plate 1 | Plate 2 | |
|---|---|---|---|---|---|---|---|
| 1 | 5 | 5 | 5 | 5 | 5 | 5 | 10.0 |
| 5 | 0 | 0 | 0 | 0 | 0 | 0 | 0.0 |
| 10 | 0 | 0 | 0 | 0 | 0 | 0 | 0.0 |
| 15 | 0 | 0 | 0 | 0 | 0 | 0 | 0.0 |
| 20 | 0 | 0 | 0 | 0 | 0 | 0 | 0.0 |
| 25 | 0 | 0 | 0 | 0 | 0 | 0 | 0.0 |
| 50 | 0 | 0 | 0 | 0 | 0 | 0 | 0.0 |
| 100 | 0 | 0 | 0 | 0 | 0 | 0 | 0.0 |
| 0 | 5 | 5 | 5 | 5 | 5 | 5 | 10.0 |

¹Mean is the average of the three replications; each replication consists of two plates, as reported.

EXAMPLE IV

Glucose-yeast extract agar (GYEA) plates are prepared from the following materials:

| | |
|---|---|
| Agar | 15 grams |
| Glucose | 10 grams |
| Yeast Extract (Difco) | 2 grams |
| Distilled Water | 1000 milliliters |

Fungi are inoculated onto GYEA plates 48 hours before the test is to be connected.

Liter flasks of GYEA medium and stock solutions are prepared on the same day. The stock solutions are aqueous solutions of potassium azide having the following concentrations:

| | |
|---|---|
| Stock Solution No. 1 | 0.1 g KN₃/10 ml |
| Stock Solution No. 2 | 0.1 g KN₃/ml |

After autoclaving, the flasks are maintained in a water bath at 45°C. until the stock solutions are added. Addition of the stock solutions is accomplished according to the following schedule to achieve the recited concentrations:

| KN₃ Concentration, ppm. | Formulation |
|---|---|
| 5 | 0.5 ml Stock Solution No. 1/liter of GYEA medium |
| 10 | 1.0 ml Stock Solution No. 1/liter of GYEA medium |
| 15 | 1.5 ml Stock Solution No. 1/liter of GYEA medium |
| 25 | 2.5 ml Stock Solution No. 1/liter of GYEA medium |

-Continued

| KN₃ Concentration ppm. | Formulation |
|---|---|
| 50 | 0.5 ml Stock Solution No. 2/liter of GYEA medium |
| 100 | 1.0 ml Stock Solution No. 2/liter of GYEA medium |
| 500 | 5.0 ml Stock Solution No. 2/liter of GYEA medium |

The media are then agitated and 10 to 12 milliliter aliquots are immediately poured into plastic petri dishes (100 × 15 millimeters). The plates are allowed to harden and dry overnight. Within 12 to 24 hours of pouring, each plate is inoculated by cutting 3 millimeter plugs from the 48-hour fungus cultures with a flame-sterilized cork borer and transferring to the center of each plate. Three replicate plates of each treatment are inoculated with each fungus isolate tested. The plates are placed into brown paper bags and incubated at 27°C. for 7 days. The diameters of the fungus colonies growing from the inoculum plugs are measured after 24, 48, and 144 hours. Plugs from which no fungus growth is observed are transferred to fungicide-free GYEA medium after 7 days. Growth or lack of growth from these plugs is recorded after 10 days incubation at 27°C. The identity of the fungi and the fungistatic and fungicidal concentrations of the potassium azide are shown in Table 4.

Table 4

Effects of Potassium Azide on Hyphal Growth of Selected Fungi

| Fungus | Fungistatic Concentration[1], ppm | Fungicidal Concentration[2], ppm |
|---|---|---|
| Pythium aphanidermatum | 50 | 100 |
| P. debaryanum | 25 | 50 |
| P. deliense | 25 | 50 |
| P. irregulare | 25 | 50 |
| P. mamillatum | 25 | 25 |
| P. paroecandrum | 15 | 25 |
| P. proliferum | 100 | Not Tested |
| P. spinocum | 25 | 25 |
| P. ultimum | 25 | 50 |
| Sclerotium rolfsii | 10 | 25 |

[1] Lowest KN₃ concentration tested at which there was no growth from the inoculum plug on media containing KN₃.
[2] Lowest KN₃ concentration which killed the fungus on the inoculum plugs.

EXAMPLE V

A field is prepared in the spring and divided into 12 plots, each measuring 109 × 40 feet. The 12 plots are divided into groups of three and the following applications are made to each group using a Gandy applicator:

5 pounds of 10% KN₃ granules per plot
10 pounds of 10% KN₃ granules per plot
20 pounds of 10% KN₃ granules per plot
No treatment The location of each plot is such that the plots comprising the groups are randomized. After the granules are applied, they are incorporated with a disc-harrow set about 8 inches deep. Vernam S-propyl dipropylthiocarbamate herbicide formulation containing 77.8 per cent by weight active ingredient is applied at a rate of 3 pints per acre prior to planting peanuts. Peanuts are then planted. In the late spring the roots of peanut plants from each plot are examined. The roots of the peanuts in the 20 lb/acre and 10 lb/acre potassium azide treatment areas are white, firm, and appear healthy. Many of the roots in the areas not treated with potassium azide have black rotten areas in the root system. The disease is identified as Sclerotium rolfsii.

EXAMPLE VI

Soil having a pH of 6.9 and known to be infested with a fungus disease complex (pod rot) including Pythium spp. and Sclerotium rolfsii is prepared for planting and is divided up into plots measuring 13½ × 165 feet. Plots are treated with 10 per cent KN₃ granules at the following rates:

5 lb KN₃ active ingredient/acre
10 lb KN₃ active ingredient/acre
20 lb KN₃ active ingredient/acre
No azide treatment The granules are incorporated immediately after application with a disc-harrow set for a depth of 8 inches. Prior to planting Vernam S-propyl dipropylthiocarbamate herbicide is applied for control of weeds. The plots are then seeded with peanuts. In the fall, the plots were harvested and graded. The results are shown in Table 6.

Table 6

Effect of Potassium Azide in Pythium spp. and Sclerotium rolfsii Infested Field Plots

| Concentration of KN₃, lb active Ingredient/acre | Yields, lb/plot Rep. I | Rep. II | Average Yield, lb/acre | Quality, $/cwt | Value $/acre |
|---|---|---|---|---|---|
| 5 | 113½ | 128 | 2420 | 14.67 | 355.01 |
| 10 | 133 | 123 | 2560 | 14.83 | 379.64 |
| 20 | 138 | 126½ | 2650 | 14.78 | 391.67 |
| 0 | 108½ | 101 | 2100 | 13.90 | 291.90 |

In the soil not treated with potassium azide approximately 30 per cent of the crop was lost because of pod rot.

EXAMPLE VII

The general procedure of Example VI is repeated in soil having a pH of 6.3 and also known to be infested with a fungus disease complex (pod rot) including Pythium spp. and Sclerotium rolfsii. The results are shown in Table 7.

Table 7

Effect of Potassium Azide in Pythium spp. and Sclerotium rolfsii Infested Field Plots

| Concentration of KN₃, lb active Ingredient/acre | Yield, lb/acre | Quality, $/cwt | Value $/acre |
|---|---|---|---|
| 5 | 3300 | 14.26 | 470.58 |
| 10 | 3800 | 14.78 | 550.64 |
| 20 | 4200 | 14.52 | 609.84 |
| 0 | 3200 | 14.45 | 462.40 |

In the soil not treated with potassium azide, approximately 25 per cent of the crop was lost because of pod rot.

EXAMPLE VIII

The general procedure of Example VI is repeated in soil having a pH of 5.6 and also known to be infested with a fungus disease complex (pod rot) including *Pythium* spp. and *Sclerotium rolfsii*. The results are shown in Table 8.

Table 8

Effect of Potassium Azide in *Pythium* spp. and *Sclerotium rolfsii* Infested Field Plots

| Concentration of $KN_3$, lb active Ingredient/acre | Yield, lb/acre | Quality, $/cwt | Value $/acre |
|---|---|---|---|
| 5 | 1300 | 13.00 | 169.00 |
| 10 | 1320 | 13.00 | 171.60 |
| 20 | 1920 | 13.00 | 249.60 |
| 0 (Check I) | 560 | 13.00 | 72.80 |
| 0 (Check II) | 700 | 13.00 | 101.00 |

In the soil not treated with potassium azide, approximately 80 per cent of the crop was lost because of pod rot.

EXAMPLE IX

Soil having a pH of 6.8 and known to be infected with a fungus disease complex (pod rot) including *Sclerotium rolfsii* is prepared for planting and is treated with Vernam S-propyl dipropylthiocarbamate herbicide. A portion of the field is divided into plots measuring 6 × 181 feet. Plots are treated with 10 per cent $KN_3$ granules or 8 per cent $NaN_3$ granules at the following rates:

5 lb $KN_3$ active ingredient/acre
10 lb $KN_3$ active ingredient/acre
20 lb $KN_3$ active ingredient/acre
4 lb $NaN_3$ active ingredient/acre
8 lb $NaN_3$ active ingredient/acre
16 lb $NaN_3$ active ingredient/acre
No azide treatment The granules are incorporated immediately with a disc-harrow set 8 inches deep. The disc-harrow is pulled over the plots 4 times. In the fall, the plots are harvested. The results are shown in Table 9. However, plants which would easily produce at least 10 pounds of peanuts were dug for observation out of each of the $KN_3$ plots. The 5 and 20 lb/acre rates of $KN_3$ were particularly affected. The per acre yields are accordingly at least 400 pounds too low.

Table 9

Effect of Potassium Azide and Sodium Azide in *Pythium* spp. and *Sclerotium rolfsii* Infested Field Plots

| Concentration, lb active Ingredient/acre $KN_3$ | $NaN_3$ | Yield lb/plot | Yield lb/acre | Quality, $/cwt | Value $/acre |
|---|---|---|---|---|---|
| 5 | — | 86½ | 3460 | 13.54 | 469.48 |
| 10 | — | 92½ | 3700 | 13.73 | 508.01 |
| 20 | — | 86 | 3440 | 13.73 | 462.31 |
| — | 4 | 94 | 3760 | 13.61 | 512.73 |
| — | 8 | 93½ | 3740 | 13.73 | 513.50 |
| — | 16 | 99 | 3960 | 13.54 | 536.18 |
| 0 | 0 | 87½ | 3500 | 13.54 | 473.90 |

I claim:

1. A method comprising incorporating into soil containing at least one fungus selected from the group consisting of Sclerotium spp. and Pythium spp., an amount of azide selected from the group consisting of alkali metal azide, alkaline earth metal azide, ammonium azide and mixtures thereof, effective to at least retard the growth of said fungus.

2. The method of claim 1 wherein said azide is selected from the group consisting of sodium azide, potassium azide and mixtures thereof.

3. The method of claim 1 wherein said fungus is a Pythium spp.

4. The method of claim 1 wherein said fungus is *Sclerotium rolfsii*.

5. The method of claim 1 wherein a fungistatic amount of said azide is applied.

6. The method of claim 1 wherein a fungicidal amount of azide is applied.

7. The method of claim 1 wherein the amount of said azide incorporated into the soil is in the range of from about 0.5 to about 500 pounds per acre.

8. The method of claim 1 wherein the amount of said azide incorporated into the soil is in the range of from about 5 to about 25 pounds per acre.

9. A method comprising:
    a. incorporating into soil containing at least one fungus selected from the group consisting of Pythium spp. and Sclerotium spp. an amount of alkali metal azide selected from the group consisting of sodium azide, potassium azide and mixtures thereof, effective to at least retard the growth of fungus; and
    b. planting crops within 120 days of the incorporation of said alkali metal azide.

10. The method of claim 9 wherein said azide is incorporated into said soil before crops are planted.

11. The method of claim 10 wherein peanuts are planted after said azide is incorporated into said soil.

12. The method of claim 10 wherein the crops are peanuts and the planting is accomplished by seeding.

13. The method of claim 9 wherein the amount of said alkali metal azide incorporated in the soil is in the range of from about 0.5 to about 500 pounds per acre.

14. The method of claim 9 wherein the amount of said alkali metal azide incorporated in the soil is in the range from about 5 to about 25 pounds per acre.

15. The method of claim 13 wherein the crops are peanuts and the planting is accomplished by seeding.

16. The method comprising applying to at least one fungus selected from the group consisting of Pythium spp. and Sclerotium spp. an amount of azide selected from the group consisting of alkali metal azide, ammonium azide and mixtures thereof, effective to at least retard the growth of said fungus.

17. The method of claim 16 wherein said azide is selected from the group consisting of sodium azide, potassium azide and mixtures thereof.

18. The method of claim 16 wherein said fungus is a Pythium spp.

19. The method of claim 16 wherein said fungus is *Sclerotium rolfsii*.

* * * * *